United States Patent

Kirk

[11] Patent Number: 5,246,116
[45] Date of Patent: Sep. 21, 1993

[54] METHOD AND APPARATUS FOR SEPARATION AND RECOVERY OF THE COMPONENTS FROM FOIL-CONTAINING LAMINATES

[75] Inventor: Thomas E. Kirk, Henrico County, Va.

[73] Assignee: Reynolds Metals Company, Richmond, Va.

[21] Appl. No.: 948,525

[22] Filed: Sep. 22, 1992

[51] Int. Cl.$^5$ .............................. B03B 1/02; B03B 1/04
[52] U.S. Cl. .......................................... 209/3; 209/11; 209/13; 209/211; 209/450; 209/166; 209/172; 209/173
[58] Field of Search ..................... 209/3, 4, 11, 13, 17, 209/18, 44, 166, 170, 172, 173, 208, 211, 448, 450, 453, 305; 162/4, 5, 6; 241/19, 21, 24, 79.1

[56] References Cited

U.S. PATENT DOCUMENTS

| | | | |
|---|---|---|---|
| 3,091,334 | 5/1963 | Morton | 209/211 |
| 3,335,966 | 8/1967 | Haveman | 209/3 X |
| 3,595,741 | 7/1971 | Goss . | |
| 4,000,031 | 12/1976 | Acobas | 209/173 X |
| 4,119,533 | 10/1978 | Seitoh et al. . | |
| 4,200,486 | 4/1980 | Vagac et al. . | |
| 4,362,600 | 12/1982 | Lindstrom et al. . | |
| 4,379,048 | 4/1983 | Jansen | 209/172 X |
| 4,399,027 | 8/1983 | Miller | 209/170 X |
| 4,566,942 | 1/1986 | Holz et al. . | |
| 4,578,184 | 3/1986 | Rasmussen | 209/172 X |
| 4,746,422 | 5/1988 | Grimm . | |
| 4,830,188 | 5/1989 | Hankigen et al. | 209/3 |
| 4,981,876 | 1/1991 | Grimmer . | |
| 5,084,135 | 1/1992 | Brooks et al. . | |

*Primary Examiner*—Robert P. Olszewski
*Assistant Examiner*—Dean A. Reichard
*Attorney, Agent, or Firm*—Alan T. McDonald

[57] ABSTRACT

A method for the separation and recovery of foils, in particular aluminum foils, and the other components in waste foil-containing laminates includes subjecting the waste laminates to agitation in a heated polyalkylene glycol polymer solution. The thus heated mixture is cooled to permit density variations to separate the plastic and paper components of the waste laminate from the foil components therein. The separated foil components can be recovered from the polyalkylene glycol polymer solution for recycle or other use. Using a polyalkylene glycol polymer solution permits recovery of the glycol polymer in a heated recovery tank to recycle the polymer to facilitate further foil separation while minimizing adverse effects on the environment.

19 Claims, 1 Drawing Sheet

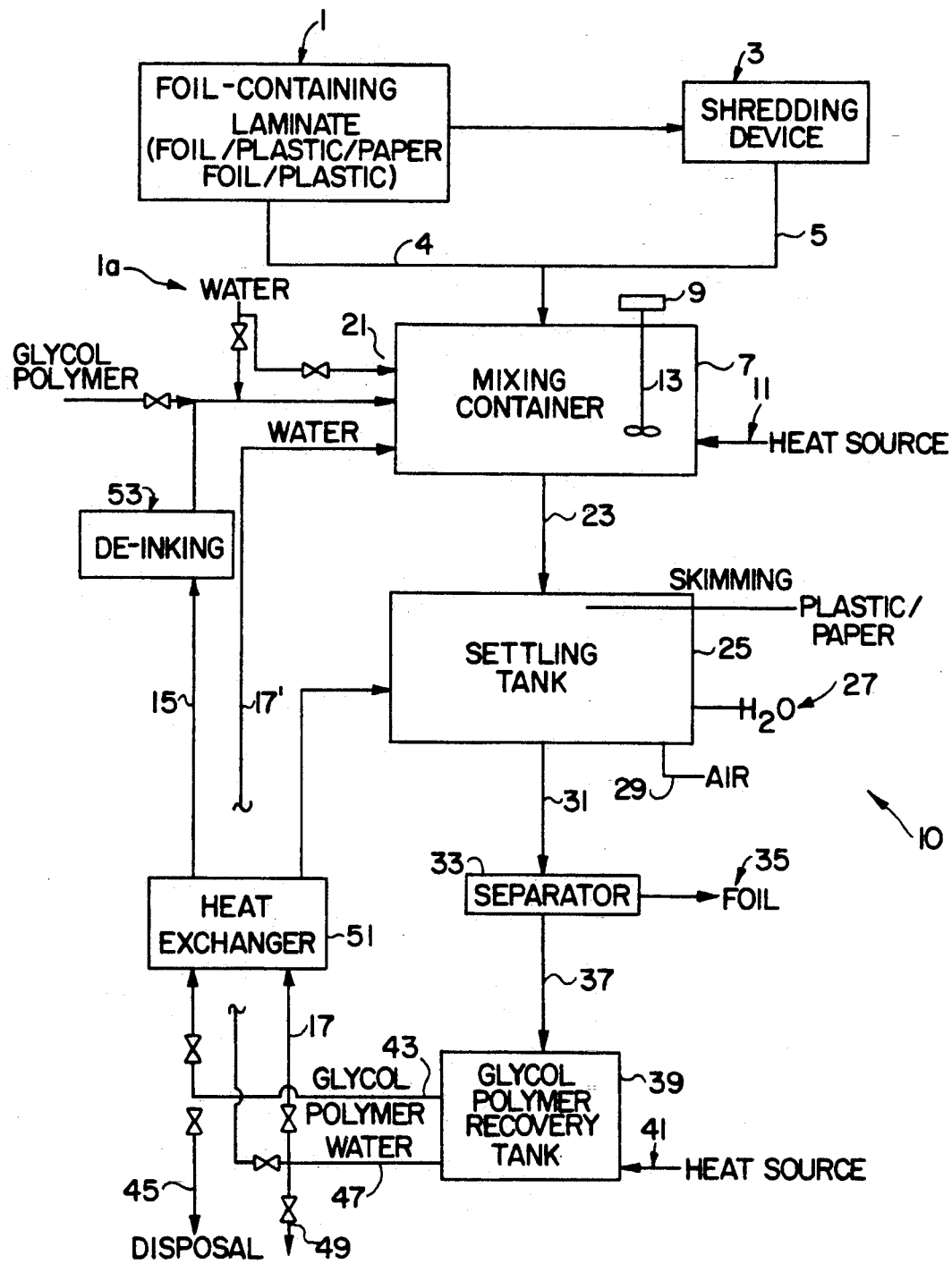

METHOD AND APPARATUS FOR SEPARATION AND RECOVERY OF THE COMPONENTS FROM FOIL-CONTAINING LAMINATES

TECHNICAL FIELD

The invention is directed to a method and apparatus for the separation of foils and other components from foil-containing laminate material such as packaging waste by subjecting the laminate material to a polyalkylene glycol polymer solution followed by density and flotation separation techniques for complete component separation and recovery.

BACKGROUND ART

In the packaging industry, foil-containing laminates are widely utilized during packaging or package manufacturing. These types of foil-containing laminates include both foil/plastic/paper laminates and foil/plastic laminates. Typically, the foil is an aluminum foil with a plastic including polypropylene, high and low density polyethylene and polyester.

The foil/plastic laminates may be formed into a structure to be used in packaging using either an adhesive to bond the foil/plastic or by resin pellets which are then extruded onto the foil to produce the structure. Typically, the thickness of the metal foil ranges from 0.00025 to 0.002 inches. A typical thickness of the plastic is normally expressed in mils and ranges from 0.5 to 4.0. The ordering of layers in any given laminate may vary depending on the particular packaging application.

Film laminates require an adhesive which can either be a solvent-based material or an aqueous based material. Typically, the papers employed are acid or alkaline bleached pulp.

The manufacture of packages generates a considerable amount of waste material. The waste material coming off a packaging line is either accumulated on a spool or mandrel or shredded into smaller pieces. The collected waste material is then sent to a landfill or incinerated.

With the decreasing availability of space for landfills and increasing cost for use of these landfills, mere disposal of these packaging waste materials is undesirable. Likewise, incineration of these wastes also presents problems related to high cost for incinerator operation due to extensive pollution abatement equipment and resistance by local communities for construction of new incinerator facilities.

In view of the disadvantages associated with landfills and incineration as disposal means for these types of packaging wastes, the prior art has developed numerous techniques for waste material recovery.

In particular, processes have been proposed to separate plastics from other contaminants such as metals or the like. U.S. Pat. No. 4,746,422 to Grimm discloses a method for the separation of a mixture of plastic particles and contaminants by applying a two-phase solution composed of a halogenated hydrocarbon and water to the mixture. The two-phase solution and mixture are rotated in a separator wherein the contaminant having a density greater than the halogenated hydrocarbon is separated by gravitation from the plastic. This method is especially adapted for removing aluminum and/or glass contaminates from plastic bottles and containers. This method is disadvantageous in using halogenated hydrocarbons since they can have adverse environmental effects if allowed to escape from the processing system.

U.S. Pat. No. 4,200,486 to Vagac et al discloses a method and apparatus for reclaiming metals and plastics from scrap paper. This patent utilizes cyclone separators wherein particles of metal foil leave the treatment line in the shape of balls.

U.S. Pat. No. 3,595,741 to Goss teaches a method of reclaiming stock from waste material which utilizes organic solvent extraction followed by solvent removal via distillation. This patent is concerned with fibrous waste material which has plastic or resin associated therewith. No provisions are provided for removing metal in the fibrous waste material.

Flotation techniques have also been employed to separate and/or recover plastics in plastic-containing materials.

U.S. Pat. No. 4,119,533 to Saitoh et al teaches a method of separating highly hydrophobic plastics from a plastics mixture by placing the plastics mixture in an aqueous liquid medium and agitating the medium to float the plastics on the surface thereof to facilitate removal.

U.S. Pat. No. 5,084,135 to Brooks et al discloses another method of reclaiming plastic and cellulosic fiber from plastic coated waste utilizing flotation techniques. The plastic coated waste is subjected to flotation with agitation to separate the plastic from the cellulosic fiber.

U.S. Pat. No. 4,981,876 to Grimmer teaches a process of separating vinyl skin from foam backing by granulating the plastic composite into small chips and mixing the chips with a quantity of water, the mixing step causing the chips to swell and float and separate from the heavier vinyl bits. The separated foam and vinyl are then recovered.

U.S. Pat. No. 4,566,942 to Holz et al relates to a method of treating waste paper, wherein the waste paper is steeped and chemically treated at the same time followed by a density adjustment and sorting step.

U.S. Pat. No. 4,362,600 to Lindstrom et al chemically separates unbleached sulphate fibers from other fibers using high molecular polyalkylene oxides, preferably polyethylene oxide. The patent to Lindstrom et al merely treats waste paper, not waste materials containing metal foil such as aluminum.

None of the prior art discussed above effectively recovers metal foil and the other components from foil-containing laminates used in the packaging industry. Accordingly, a need has developed to provide improved methods and apparatus for the separation and recovery of these types of metal foils that are simple, economical, effective and environmentally sound.

In response to this need, the present invention provides a method and apparatus for the separation and recovery of metal foil, in particular aluminum, and the other components used in these types of laminates. The inventive method and apparatus utilize a polyalkylene glycol polymer solution to form a mixture with the waste material. The mixture is subsequently treated using density variations between the foil and non-foil components to separate and recover all components. The polymer solution and water used in the process can be recycled to eliminate the need for disposal and resupply of additional polymers. Again, none of the prior art discussed above teaches or fairly suggests a method and apparatus for the separation and recovery of metal foils in foil-containing laminates generated as packaging waste.

SUMMARY OF THE INVENTION

It is a first object of the present invention to provide an improved method and apparatus for the separation and recovery of metal foil from foil-containing laminates.

It is another object of the present invention to permit recovery and recycling of metal foil, in particular, aluminum foil, present in packaging material waste.

Another object of the present invention includes the elimination for the need of incineration or landfill disposal of foil-containing laminates as packaging material waste.

It is a further object of the present invention to provide a method and apparatus for the recovery of packaging industry waste with no adverse effect on the environment.

Other objects and advantages of the present invention will become apparent as a description thereof proceeds.

In satisfaction of the foregoing objects and advantages, the method of recovering foil, in particular, aluminum foil, from a foil-containing laminate comprises the steps of providing a foil-containing laminate in a predetermined size. The foil-containing laminate includes foil/plastic laminates and foil/plastic/paper laminates. The foil-containing laminate is combined with a polyalkylene glycol polymer aqueous solution to form a mixture. The solution is heated to from between 80° and 100° C. for a predetermined period of time while being agitated.

The heated mixture is subsequently cooled. The cooled mixture is then subjected to flotation techniques to separate plastic components from the foil-containing laminate. Subsequent to removal of the plastic components, the foil is separated and recovered from the aqueous solution. Following separation and recovery of the foil, the solution is heated to at least 90° C. to separate and recover the polyalkylene glycol polymer from the solution. The recovered glycol polymer can be reused in the mixing and heating step.

In another aspect of the invention, and when the foil-containing laminate includes a paper component, air is injected during the plastic component separating step to foam the glycol polymer and remove the paper component by flotation. In a preferred mode of operation, the size range of the foil-containing laminates range from 2 to 4 inches square.

The apparatus for separating and recovering metal foil comprises a source of foil-containing laminates and a source of polyalkylene glycol polymer aqueous solution. The foil-containing laminates and aqueous solution are charged to a mixing tank which may include heating and agitating means. The mixing tank facilitates separation of the various components contained in the foil-containing laminates. A settling tank is provided to receive the mixture after cooling. The settling tank includes means for injecting water into the mixture for flotation separation of plastic components of the foil-containing laminate. Means for separating and recovering the foil from the mixture are provided subsequent to flotation separation of the plastic components. Means are also provided for separating the polyalkylene glycol polymer aqueous solution into the glycol polymer and water to facilitate recycling of these components.

In a further embodiment, the apparatus includes means for injecting air into the settling tank for flotation separation of paper components contained in the mixture. Moreover, the foil-containing laminates may be shredded to predetermined sizes to facilitate separation of laminate components in the mixing tank.

BRIEF DESCRIPTION OF DRAWINGS

Reference is now made to the drawing accompanying the application wherein the sole figure depicts a flow diagram illustrating the process steps and exemplary apparatus components associated with the invention.

DESCRIPTION OF THE PREFERRED EMBODIMENTS

The inventive process and apparatus are designed to function with waste material generated during the making of a package which would otherwise go to a landfill or be incinerated. By recycling process fluids, adverse effects on the environment are avoided. Moreover, the organic component of the process has low vapor pressures at the operating conditions thereby minimizing any adverse air polluting effects.

Although the inventive process and apparatus are especially adapted for use with waste generated in the packaging industry, waste generated in other industries which comprise foil-containing laminates such as foil/plastic/paper or foil/plastic may be utilized in the inventive apparatus and method. Limitations on the utilization of waste from other industries coincide with any limitations discussed below concerning the foil-containing laminate structure and/or component makeup and properties. Any non-ferrous metal foil such as copper or aluminum is adaptable for separation and recovery according to the invention. Aluminum is a preferred metal foil for separation and recovery.

With reference now to the sole figure, one embodiment of the inventive method and apparatus are generally designated by the reference numeral 10. A source of foil-containing laminate is generally designated by the reference numeral 1. The source may include either a foil/plastic/paper laminate or a foil/plastic laminate. When using foil-containing laminate from package manufacturing or packaging, they come in various forms. In one embodiment the foil-containing laminate can be charged to a shredding device 3 which sizes the laminate to a preferred size range for further processing. The shredding device may be any known type of conventional laminate or strip shredding device capable of obtaining a predetermined product size. A shredding device should be capable of breaking down the foil-containing laminate into a small enough size such that the foil can be separated from the remaining laminate components. A preferred size includes squares ranging between 2 and 4 inches on a side. Of course, other polygonal shapes having equivalent areas can also be utilized as preferred starting materials. Material sizes outside this range are also contemplated by the invention but may not provide optimum operating efficiencies.

The discharge 5 of the shredding device 3 is charged to a mixer 7. In an alternative mode, and assuming the foil-containing laminate is properly sized, the laminate can be directly charged into the mixer as shown by the path designated by reference numeral 4. The mixing container 7 includes an agitating device 9 and a heat source 11. The agitating device 9 includes a stirrer 13 which agitates the mixture as described below. The heat source 11 may be any conventional means to heat the mixture contained in the mixing container.

The sized foil-containing laminate, preferably squares, are charged into the mixing container 7 with a solution of a polyalkylene glycol polymer and water. The solution concentration y from about 75 to 90 parts polyalkylene glycol polymer and 10 to 25 parts of water. A preferred mixture includes 80 parts of polyalkylene glycol polymer and 20 parts of water.

In one mode of the inventive process, the recycled polyalkylene glycol polymer designated by the reference numeral 15 can be charged to the mixing container 7. In this mode, recycled water designated by the reference numeral 17 can be added to the mixing container to achieve the proper concentration. Alternatively, an outside source of water designated by the reference numeral 19 can be added directly to the recycled glycol polymer 15 or directly to the mixing container at reference numeral 21.

The mixture of the squares of foil-containing laminate and polymer solution is then heated to between about 80° and 100° C. with stirring using the agitating device 9, preferably about 100° C. Care should be taken during this heating and stirring step to avoid making balls of the foil. Balling of the foil inhibits the process of separating the foil from the plastic and paper. Preferably, the foil thickness should be greater than 0.0005 inches to avoid balling and avoid excessive times for delamination. Alternatively for foil thicknesses less than 0.0005 inches, the agitation may derive from the bubbling and boiling action of the mixture. In this mode, the mixture temperature should be high enough to achieve the boiling action.

The time that the mixture is subjected to the heat and/or stirring varies depending on the type of laminate used. Typically, a time of 3 to 4 hours is sufficient to achieve separation of the various components.

After the mixture has been heated and stirred for a sufficient period of time, the heating is discontinued to permit the mixture to cool to ambient temperature. After achieving ambient temperature, the cooled mixing container discharge 23 is transferred to a settling tank 25. Water is added to the settling tank to float up the plastic or polymer portion of the laminate. The water may be provided as an outside source 27 or from the recycled water source 17. Once the plastic or polymer portion of the laminate has floated to the upper portion of the settling tank, a conventional skimming device is used to remove the plastic portion of the laminate. Alternatively, the plastic portion may be pumped off the surface to facilitate recovery thereof.

In another mode of the invention when the foil-containing laminate includes a paper component, a gentle flow of air 29 is introduced into the bottom of the settling tank 25 to assist in the removal of the paper portion of the laminate. The removal of the paper portion is facilitated by the natural tendency of the glycol polymer to foam which aids in the paper portion flotation.

Flotation of the plastic and paper portions of the laminates in the settling tank leave the metal foil portion at the bottom of the settling tank. The separation of the metal foils from the plastics is facilitated by the density variations therebetween. Typically, the density of the plastic portion of the laminate ranges from 0.90 gm/cc for polypropylene, 0.915–0.920 gm/cc for low density polyethylene and 0.944 to 0.948 gm/cc for high density polyethylene. In contrast, the density of the aluminum foils normally used in the packaging industry range from 2.690 to 2.713 gm/cc.

Once the metal foils have been separated from the plastic and/or paper components of the foil-containing laminate, the settling tank discharge 31 is fed to a separator 33 which separates the foil 35 from the glycol polymer solution 37. The separator may be any conventional type such as a filtering device or centrifuging device. A filtering device is preferred since it can be utilized in line when the settling tank discharge 31 is transferred or pumped to the glycol polymer recovery tank 39.

Utilization of polyalkylene glycol polymers in the inventive method and apparatus provide additional advantages besides facilitating separation of the components of the foil-containing laminates in the mixing container as described above. In a preferred embodiment, the polyalkylene glycol polymer includes linear polymers of equal amounts of ethylene oxide and propylene oxide started with butanol. The molecular weight is dependent upon the chain length. The preferred molecular weights vary from 270 to 1230. The overall range extends from about 200 to 10,000. The glycol polymer is water soluble at temperatures below 40° C. Because of ethoxylation, these compounds exhibit reverse solubility. At temperatures above 40° C., a solution of the glycol polymer separates into two layers, the top being the polyalkylene glycol polymer with the bottom layer being water. This separation characteristic of the glycol fluid permits recycling of the glycol polymer solution after foil separation.

The glycol polymer is believed to function in one mode as a type of solvent to separate or delaminate the foil from plastic or paper components, especially where adhesive is used for bonding of foil with another component. Where pressure type bonding, as in extrusion, is used to laminate the components together, the glycol polymer softens the non-foil components to facilitate delamination.

The densities of the preferred material range from 0.919 to 0.983. The densities of the broad range of molecular weights ranges from 0.919 to 1.002. These densities are measured at 100° C.

In the broadest sense, the polyalkylene glycol polymer has a formula as shown below:

$$R_{10}[CH_2CHO]_a[CH_2CH_2O]_bH$$ with CH$_3$ on the first unit $R_{10}$ is selected from the group consisting of hydrogen, normal hydrocarbons having from about 2 to 20 carbon atoms, polyhydroxy substituted hydrocarbons having from about 2 to about 10 carbon atoms, aryl hydrocarbons having from about 6 to 20 carbon atoms and alkyl aryl hydrocarbons having from 7 to 30 carbon atoms, and a may range from about 0 and about 75 and b may range between about 1 and 100 and B is equal to or greater than A.

Still with reference to the sole figure, and after separation of the foil 35, the glycol polymer solution 37 is transferred to the glycol polymer recovery tank 39. The glycol polymer recovery tank 39 includes a heat source 41 similar to the heat source 11 associated with the mixing container 7. The glycol polymer solution in the recovery tank 39 is heated to at least 90° C. to facilitate separation of the glycol polymer and water by ethoxylation as discussed above. The glycol portion 15 can be pumped back to the mixing container 7 as a recycled glycol polymer 15, or alternatively, disposed as shown by the reference numeral Likewise, the water 47 discharge from the glycol polymer recovery tank may be used as a water recycle 17 to the mixing container 7 or the settling tank 25. Alternatively, the water can be disposed as designated by the reference numeral 49.

If the recovered water 47, is recycled, a heat exchanger 51 may be provided which effectively cools the water 17 and heats the recycled glycol polymer 15. Since the settling tank 25 is at ambient conditions, it is necessary to cool the recycled water 17 prior to addition to the settling tank.

With reference back to FIG. 1, the separated foil 35 may be recycled as scrap material for other aluminum product manufacture.

In yet another mode of the inventive process, the water discharged from the glycol polymer recovery tank 39 may be recycled to the mixing container 7 via recycle line 17'. Since the mixing container 7 is heated, the recycle water 17' does not require heat exchange as shown for the settling tank 25.

With reference again to FIG. 1, the recycle glycol polymer 15 can include a de-inking step 53. This additional process step is required when the recovered glycol polymer 43 includes ink derived from the particular printing system utilized with the foil-containing laminate. The de-inking of the recycled glycol polymer clarifies the polymer prior to addition to the mixing container 7. Since these types of de-inking and clarifying processing techniques for these types of polymers are well known in the art and not an aspect of the present invention, further discussion thereof is not included.

It should be noted that the appropriate valves are indicated in the various glycol polymer and water recycle, source and disposal lines to facilitate selection of a particular mode of the inventive process.

Utilization of the polyalkylene glycol fluids also minimizes any adverse effect on the environment during processing of the foil-containing laminates. The glycol polymer fluids have low vapor pressures, e.g. less than 0.01 torr at 100° C. Thus, there are no VOC's associated during separation and recovery of the metal foil and the foil-containing laminates. Moreover, in the mode of the operation when the discharge water 47 is totally recycled, discharge of water into the environment is avoided.

The inventive process is preferably conducted as a batch operation. The size of the batch can be dictated by the quantity of foil-containing laminate waste generated during the packaging process. Typically, a batch would comprise about 500 gallons of liquid as a charge for the mixing container with about 300 pounds of waste laminate mixed therewith. Of course, and depending on the quantities of waste generated, smaller or larger batches may be utilized during foil separation and recovery.

The sole figure also depicts exemplary components of the apparatus aspect of the invention. A mixing container, settling tank and glycol polymer recovery tank can be any known container design for conducting the types of separation techniques disclosed above. The contents of the respective containers and/or tanks can be transferred using conventional means such as pumps or the like. Likewise, the heat sources may be any conventional type capable of heating the liquids contained in the tanks and container.

The polyalkylene glycol polymers discussed above are available under the trade names of "Carbowax" and "UCON-HB" water soluble series from Union Carbide Corporation. BASF Wyandotte identifies these types of glycol fluids by the trade names "PLURONIC" and "TETRONIC".

As such, an invention has been disclosed in terms of preferred embodiments thereof that fulfill each and every one of the objects of the present invention as set forth hereinabove and provides a new and improved method and apparatus for the separation and recovery of foils in foil-containing laminates.

Various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. A method of recovering the components from a foil-containing laminate comprising the steps of:
   a) providing a foil-containing laminate in a predetermined size, said foil-containing laminate comprising foil/plastic laminate or a foil/plastic/paper laminate;
   b) combining said foil-containing laminate with a polyalkylene glycol polymer aqueous solution to form a mixture;
   c) agitating said mixture;
   d) heating said mixture to at least about 80° C. for a predetermined period of time to delaminate said foil-containing laminate;
   e) cooling said mixture;
   f) separating said plastic from said mixture by flotation;
   g) separating foil and recovering said foil from said polyalkylene glycol polymer aqueous solution;
   h) heating the remaining polyalkylene glycol polymer solution to at least 90° C. to separate and recover said polyalkylene glycol polymer from said remaining polyalkylene glycol polymer solution; and
   i) reusing said recovered polyalkylene glycol polymer in step (b).

2. The method of claim 1, wherein said providing step further comprises shredding a foil-containing laminate to obtain said predetermined size.

3. The method of claim 1, wherein said predetermined size ranges from b 2 to 4 inch square pieces.

4. The method of claim 1, wherein the foil thickness of said foil-containing laminate is less than or equal to 0.002 inches.

5. The method of claim 1, wherein said foil-containing laminate is a foil/plastic/paper laminate.

6. The method of claim 5, further comprising
   i) separating paper from said mixture by injecting air into said cooled mixture to float said paper; and
   ii) recovering said paper.

7. The method of claim 6 further comprising the step of recovering said plastic.

8. The method of claim 1 further comprising the step of recovering said plastic.

9. The method of claim 1, wherein said step of separating and recovering said foil further comprises subjecting the mixture of foil and polyalkylene glycol polymer solution to filtration.

10. The method of claim 1, wherein said step of separating and recovering said foil further comprises subjecting the mixture of foil and polyalkylene glycol polymer solution to centrifugal separation.

11. The method of claim 1, wherein said flotation step comprises adding water to said cooled mixture to float said plastics based upon density variations towards a top surface of said mixture.

12. The method of claim 1, wherein said polyalkylene glycol polymer aqueous solution comprises a mixture of 75 to 90 parts of polyalkylene glycol polymer and 25 to 10 parts of water.

13. The method of claim 12, wherein said mixture comprises 80 parts polyalkylene glycol polymer and 20 parts water.

14. An apparatus for separation and recovery of the components in foil-containing laminates comprising:
   a) a source of foil-containing laminates;
   b) a source of a polyalkylene glycol polymer aqueous solution;
   c) a mixing tank for receiving a mixture of said foil-containing laminate and said polyalkylene glycol polymer aqueous solution, said mixing tank including means for agitating and heating said mixture;
   d) a settling tank for receiving said mixture, said settling tank including means for injecting water into said mixture for flotation separation of plastic in said mixture;
   e) means for separating and recovering a foil from said mixture; and
   f) means for separating said polyalkylene glycol polymer aqueous solution into a polyalkylene glycol polymer and water.

15. The apparatus of claim 14 further comprising means for injecting air into said settling tank for flotation separation of paper contained in said foil-containing laminate.

16. The apparatus of claim 14, wherein said means for separating and recovering foil includes a filtration or centrifugal separation device.

17. The apparatus of claim 14 further comprising a shredding device for sizing said foil-containing laminate to a predetermined size.

18. The apparatus of claim 14, wherein said means for separating said polyalkylene glycol polymer aqueous solution comprises a recovery tank for receiving said aqueous solution and means for heating said solution to produce said water and said polyalkylene glycol polymer.

19. The apparatus of claim 14 further comprising means to recycle said polyalkylene glycol polymer separated from said aqueous solution to said mixing tank.

* * * * *